J. W. CARNAHAN.
WHEEL CONSTRUCTION.
APPLICATION FILED MAR. 26, 1915.
1,218,593.
Patented Mar. 6, 1917.
2 SHEETS—SHEET 1.
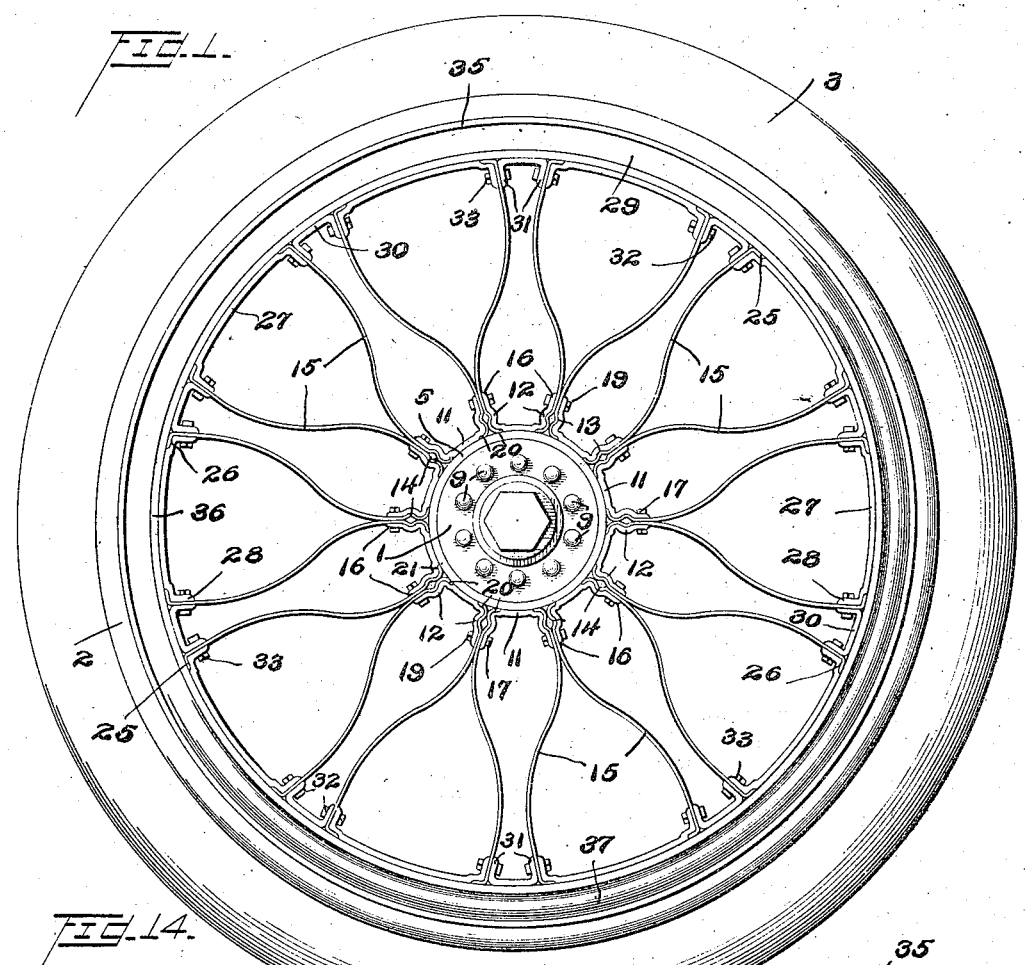
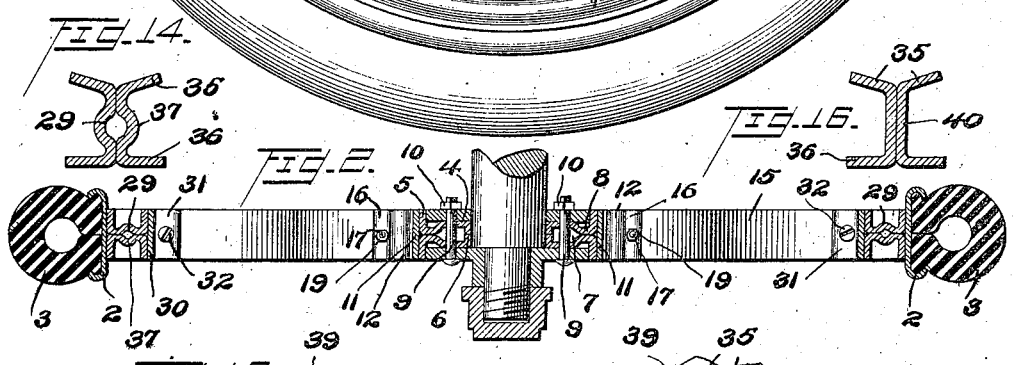
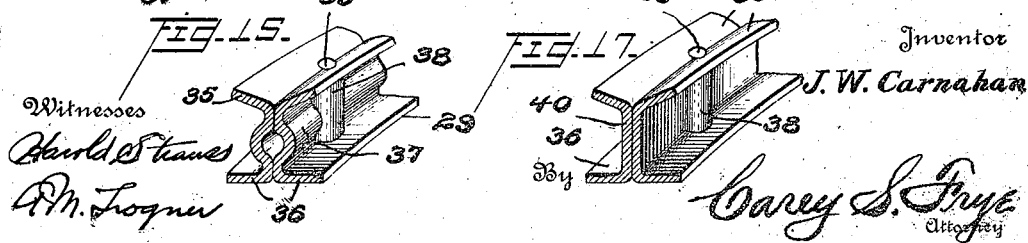
Witnesses
Inventor
J. W. Carnahan
By Carey S. Frye
Attorney

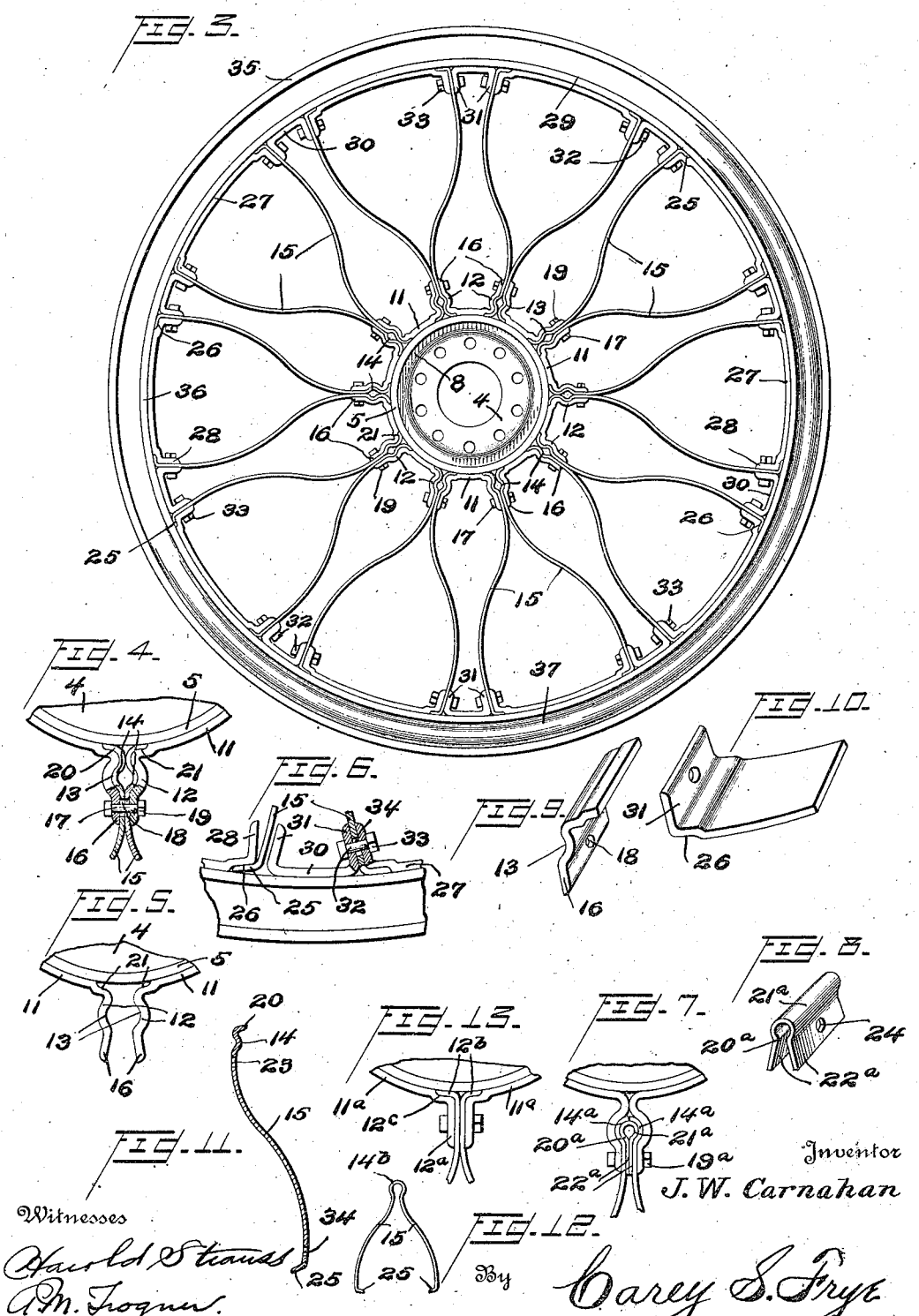

UNITED STATES PATENT OFFICE.

JOHN WORTH CARNAHAN, OF WASHINGTON, DISTRICT OF COLUMBIA, ASSIGNOR TO THE WISHBONE STEEL WHEEL COMPANY OF AMERICA, OF WASHINGTON, DISTRICT OF COLUMBIA, A CORPORATION OF DELAWARE.

WHEEL CONSTRUCTION.

1,218,593.  Specification of Letters Patent.  Patented Mar. 6, 1917.

Application filed March 26, 1915. Serial No. 17,134.

*To all whom it may concern:*

Be it known that I, JOHN WORTH CARNAHAN, a citizen of the United States, residing at Washington, in the District of Columbia, have invented certain new and useful Improvements in Wheel Construction; and I do hereby declare the following to be a full, clear, and exact description of the invention, such as will enable others skilled in the art to which it appertains to make and use the same.

My invention relates to new and useful improvements in wheel construction, and more particularly to that class adapted to be used in connection with motor propelled vehicles.

My object is to provide resilient spokes for the wheel whereby the hub will be permitted to float within the felly of the wheel when an obstruction is encountered by the tire of the wheel.

A further object is to so arrange the spokes between the hub and felly that the stress thereon will be received in every part of the spokes simultaneously and uniformly.

A further object is to provide an insert hub having resiliency therein, said insert hub being such as may be attached to the ordinary hub, or any preferred make of hub, now in use.

A further object is to provide means for locking the outer and inner ends of the spokes in engagement with the felly and hub respectively in such manner that said spokes will be held under tension at all times.

A further object is to provide a felly which may be stamped from sheets of metal, parts of said felly being so constructed that when attached to the rim of the wheel, it will engage the same under compression.

And a further object is to so construct the spokes and anchoring means therefor that they may be used in connection with belt wheels and the like to prevent undue strain upon parts of the machinery, belt or engine in starting or stopping the same or while in operation.

Other objects and advantages will be hereinafter more particularly pointed out and set forth in the accompanying specification.

In the accompanying drawings which are made a part of this application,

Figure 1 is a side elevation of my improved form of wheel construction.

Fig. 2 is a central, transverse, sectional view thereof.

Fig. 3 is an elevation of my improved device removed from the hub and rim of the wheel.

Fig. 4 is a fragmentary elevation, partly in section, showing the manner of attaching the ends of the spokes to the insert hub.

Fig. 5 is an elevation of the socket and a portion of the insert hub showing the spokes removed from the socket.

Fig. 6 is a fragmentary elevation, partly in section, showing the manner of attaching the outer ends of the spokes to the felly.

Fig. 7 is an elevation of a socket for the reception of the inner ends of a modified form of the spokes.

Fig. 8 is a perspective view of a spring locking key employed in connection with the inner ends of that form of spoke shown in Fig. 7.

Fig. 9 is a perspective view of a further modified form of socket forming member.

Fig. 10 is a perspective view of a modified form of clip employed in securing the outer ends of the spokes.

Fig. 11 is a longitudinal, central, sectional view through the preferred form of spoke.

Fig. 12 is an elevation of a modified form of spoke.

Fig. 13 is an elevation showing a further modified form of spoke and socket therefor.

Fig. 14 is an enlarged, detail, sectional view through the preferred form of felly.

Fig. 15 is a perspective view showing the manner of providing a socket on the felly for a valve stem.

Fig. 16 is an enlarged, detail, sectional view through a modified form of felly, and Fig. 17 is a perspective view showing the manner of providing a socket thereon for a valve stem.

Referring to the drawings in which similar reference numerals designate corresponding parts throughout the several views, 1 indicates the usual or any preferred form of hub flanges, such as are now used to receive the wood spokes of a wheel and 2 indicates the rim such as is ordinarily employed for receiving and retaining the tire, 3, in position on the wheel.

The prime object of my invention, in addition to providing resiliency and strength, is to construct the parts of the wheel so that they can be used in connection with, and applied to, the parts of the ordinary wheel now in use, and to this end I have provided an insert hub, 4, which is preferably constructed in two sections of disk formation, the outer ends, 5, of the sections being bent outwardly at right angles so as to form a bearing surface over the edges of the flanges 1, or between the flanges as occasion may require.

The inner ends of the sections are likewise bent inwardly and at right angles to the trend of the sections, as shown at 6 in Fig. 2, the length of said bent in portions, 6, being such that when abutted against each other they will dispose the outer faces of the sections of the hub against the inner faces of the flanges and form a hollow space, 7, between the sections of the insert hub.

The sections of the insert hub adjacent the bent out ends, 5, are bent inwardly until they center between the two flanges 7 of the hub, and rest against each other, as shown at 8 in Fig. 2, so that when a bolt, 9, or other device is extended transversely through the flanges and the insert hub, and locked in engagement therewith, a slightly yielding action will result in the insert hub between the points of engagement of the two flanges 7, which will serve as a lock for the nuts, 10, of the bolts, and at the same time serve as a slightly yielding connection between the hub and remaining portion of the wheel.

Fixed to the ends, 5, in any suitable manner, but preferably by spot welding, are strips of metal 11, the ends of each strip being extended outwardly from the hub and formed into a semi-socket member, 12, one of the semi-socket members of each strip coöperating with the next succeeding semi-socket member, each semi-socket member having an outwardly bowed portion coöperating with the bowed portions of the next succeeding members to form a substantially circular socket 13, to receive the curved or bowed portions 14, adjacent the inner ends of the spring spokes 15.

That portion of the semi-socket members beyond the sockets terminate in ears, 16, which, before the ends of the springs are secured therein, extend at an outward angle to the longitudinal trend of the semi-socket member so that when the bolt 17 is extended through the openings 18, of the ears, and the nut 19 turned home thereon, the semi-socket members will be firmly clamped into engagement with the bowed or semi-circular portions 14, of the spokes, thus forming an extremely rigid connection between the spokes and sockets, in addition to positively forcing the curved portions 14 of the spokes into engagement with the walls of the socket 13.

The inner ends of the spokes 15 are provided with curved feet 20, which are adapted to enter seats 21 formed at the juncture of the semi-socket members 12 with the metal strips 11, and in view of the fact that the semi-socket members are directed slightly at an outward angle, the act of clamping the ears together will force the walls of the seats against the outer faces of the feet and consequently force the inner faces of the feet in firm engagement with the face 5 of the insert hub, thus connecting the inner ends of the spokes as well as the socket members, together under tension, the pressure of one part counteracting the pressure of the other so as to equalize all strain on the sockets and spokes.

In Figs. 7 and 8 I have shown a modified form of structure in that the feet 20 are dispensed with and the inner ends of the spokes provided with semi-curved members 14$^a$, a spring locking key 20$^a$ being introduced between the ends of each set of spokes, said key comprising a cylindrical body portion, 21$^a$, adapted to occupy the opening formed by the semi-circular ends 14$^a$ of the spokes, and wings 22$^a$, which rest between the remaining portions of the spokes between the ears, said wings being given outward spring tension by bending the same outwardly from each other, as shown in Fig. 8, so that when the parts of the sockets are clamped together, as shown in Fig. 7, the tension of said wings will constantly direct outward pressure on the spokes and serve as a lock for the nuts 19$^a$, as well as holding said spokes in firm engagement with the faces of the socket.

The openings, 23 through the spokes 15 and the openings 24, through the wings of the locking key are greater in diameter than the diameter of the bolt 17, so that any longitudinal pulling strain of the spokes will be directed entirely against the curved walls of the sockets and not against the bolt 17.

The outer ends of each spoke member are provided with an inwardly extending tongue 25, which tongues are adapted to engage seats 26, of clips 27, the ears 28 of the clips extending beyond said seats, being adapted to engage and be clamped against the face of the spoke, said ears and seats being so constructed that when in locked position with the spoke, the tongue 25 will be forced firmly into engagement with the inner face of the felly 29.

The end of one spoke of a set is coupled with the end of the spoke of the next succeeding set, an angle plate 30 being introduced between said coöperating spokes, the ears 31 thereof, registering with the ears 28 of the clips 27 and engaging the opposite face of the spoke so that when the bolt 32 is extended through said ears, 28 and 31, and the nut 33 is turned home on the bolt, the outer end of the spoke will be securely locked in engagement with the felly.

The clips 27 and the angle plates 30 are secured to the felly in any suitable manner, but preferably by spot welding and the clips 27, also preferably extend from one spoke end to the next succeeding spoke end, but if preferred, the clips may be formed singly, as shown in Fig. 10, and spot welded to the felly.

As best shown in Fig. 6 of the drawings, the tongue or foot 25 before being brought into locked engagement with the felly rests at an angle to the edge of the felly, as does that portion of the clip 27, having the seat and ear thereon, the ear 28 also resting out of engagement with the face of the spoke until the two ears are locked together, which will result in bringing the ear 28, in alinement with the face of the spoke and the foot 25 in alinement with the face of the felly.

In this instance, the opening 34, through which the bolt 32 extends is also larger in diameter than the diameter of the bolt, so that all strain or pull longitudinally of the spoke will be directed against the foot and clips engaging the same. The ears 31 of the angle plates 30 are extended inwardly toward each other at an angle less than a right angle, said angle being coincident to the curvature of the ends of the spokes engaged with said ears, so that any circumferential strain directed against the spokes will not in any manner effect, or be directed against the ears and likewise any longitudinal strain on the spokes will not be transmitted laterally to said ears.

By engaging the inner ends of the spokes with their respective sockets and anchoring the outer ends in the manner described, said spokes will be locked in engagement with the nut and felly under tension so that the minutest disturbance of any one of the spokes will transmit the same movement to all of the remaining spokes within the wheel.

Each of the spokes 15 consists of a flat piece of metal of uniform width and thickness throughout its length, and is arranged to describe substantially a compound curve, the curvatures being uniform and gradual from the semi-circular portion at the inner end to the foot at the outer end so that any movement lengthwise of the spoke will be received uniformly at every point throughout the length of the spoke, no one portion of the spoke receiving a greater strain than the other.

As best shown in Figs. 1, 3 and 11 of the drawings, the pairs of spokes in edge elevation are so shaped as to form a resemblance to a "wishbone," and by curving the spokes in this manner and connecting the outer ends of each spoke with, or adjacent to, the outer ends of the next succeeding spokes, the said spokes will form a brace against each other or in both directions and hold against centrifugal strain and eliminate any drag of the tire or lost traction between the hub and felly.

This form of spoke not only provides resiliency between the felly and the hub but also accomplishes resilient transmission as said spokes are so curved that when the transmission gears engage the axle to transmit power thereto, the rotary force directed on to the hub will be taken up in the curvature of the spokes between their connection with the hub and the felly and as the strain is uniform throughout the length of the spokes the molecular disturbances, should any occur, will be uniform in all parts of the spoke.

Instead of making the spokes in pairs, the two may be joined together as shown in Fig. 12 of the drawings, thus making the two sections of the spoke from a single strip of material, bent upon itself to form the curved portion 14$^b$, which fits within that form of socket shown in Fig. 7, the remaining portion of the spokes being constructed and shaped similar to the spokes first described.

The felly 29 is preferably formed of two ring members cut from a sheet of metal in circular form, and then stamped into channel formation to provide outer and inner flanges 35 and 36, respectively, the flanges 36 being preferably extended at right angles to the vertical trend of the felly, while the flanges 35 are very slightly flared outwardly, so that when the rim is being shrunk around or over the felly, the flanges 35 will be drawn, to an absolute right angle to the vertical trend of the felly through the medium of pressure from dies (not shown), and by then spot welding, or otherwise attaching the flanges 35 to the rim, a positive rigid connection between the two will be effected.

In order to guard against injury to either the felly or the rim from contraction or expansion, and also to add strength to the vertical portions of the felly, as when the same receives a lateral thrust, said vertical portions are each provided with a concavo, convex rib 37, which will tend to give sufficiently to compensate for any expansion or contraction, and at the same time, when the two sections of the felly are properly secured together as by spot welding, or otherwise, form a rigid brace against any lateral movement of the parts of the felly.

This form of wheel and felly is adapted primarily to be used in connection with solid or cushion rubber tires, but should a pneumatic tire be used the vertical walls of the two sections of the felly are provided with vertically extending semicircular bowed portions 38, which when the two members of the felly are secured together will form a socket 39 for the reception of the usual form of valve stem (not shown) used in connection with the usual form of pneumatic tire.

That form of felly 40 shown in Figs. 16 and 17, is constructed exactly as the form of felly shown in Figs. 14 and 15, with the exception that the rib 37 is dispensed with.

As shown in Figs. 1 and 3 of the drawings, each strip 11 extends from one socket 13 to the other, but as shown in Fig. 9 of the drawings, each semi-socket member and the strip of metal carrying the same may be made separate from the next succeeding socket member.

As shown in Fig. 13 of the drawings, instead of forming the members and spokes with semi-bowed portions, the ears 12$^a$ are extended in a uniform direction and the ends of the spokes are provided with feet 12$^b$ to engage seats 12$^c$ at the inner ends of the ears 12$^a$, the seats and feet being extended at a slight angle to cause the feet to engage the insert hub under tension.

By forming the insert hub and the other parts of the wheel as shown, and attaching the usual form of rim thereto, it will be readily seen that the wheel can be attached to the usual or any preferred form of hub now in use, by first removing the outer hub flange and removing the spokes from the hub, when my improved form of insert hub may be introduced between the flanges and the bolts returned to their positions through the flanges, thus securely locking the wheel to the hub.

It will further be seen that by constructing the spokes of spring metal any shock caused by the tire of the wheel coming in contact with an obstruction will permit the hub to move vertically or float within the wheel, thus absorbing the shock within the spokes and preventing the same from being transmitted to the axle of the car. It will further be seen that by providing the substantially compound curve in the spoke that the twisting of the hub incident to applying power to drive the wheels, will be entirely absorbed within the curvature of the spokes and will not be transmitted to the felly, thus eliminating the jerking motion prevalent in the automobile as now constructed.

It will likewise be seen that by placing the spokes between the hub and felly under tension that they will be extremely sensitive and the slightest movement of any one of the spokes will create the same movement in all of the remaining spokes, thus distributing any jar or strain received upon the wheel uniformly through all of the spokes.

It will likewise be seen that by arranging the spokes in flat formation and opposing the edges thereof, to the lateral strain, any undue lateral movement of the felly and tire will be eliminated, and provide a wheel far superior in strength in every respect than when wood spokes are used.

It will further be seen that by constructing the spokes in the manner shown and arranging them substantially in the form of a wishbone, that said spokes will not buckle under any strain that may be directed thereon, and that when the lower springs are expanded the upper springs will be contracted and under an extreme downward movement of the hub will form hangers for the hub and limit the movement thereof.

In addition to using the resilient spokes in connection with vehicle wheels, it will be readily understood they will perform an important function in connection with belt wheels, as said spokes will yield sufficiently when an unusual strain is suddenly directed against parts of the machinery or belts employed in operating the same, thus preventing breakage of the belts or parts of the machinery.

I claim—

1. In a wheel construction, the combination with a hub and felly having spoke receiving members thereon, of flat steel spokes arranged in pairs, each pair being in substantially wish bone formation, each spoke having elongated holes near the ends thereof, said ends terminating in feet, and locking means extending transversely through said spoke receiving members and interposed spokes, said locking means extending through said elongated holes whereby any longitudinal pull upon said spokes will be directed entirely against said spoke receiving members and feet.

2. In a wheel construction, the combination with an insert hub and felly, of flat spring spokes arranged in pairs, said spokes having lateral tongue portions at each end thereof, said tongues normally resting at an angle to the hub and felly, and securing means on the hub and felly having seats for the reception of said tongues, said securing means being arranged whereby when clamped into engagement with said tongues and against the faces of the spokes, said tongues will be forced into alinement with the face of the felly and hub and the spokes stretched lengthwise to tension the same.

3. In a wheel construction the combination with the flanges of the wheel hub, of an insert hub comprising a pair of disk like members adapted to be engaged between the flanges of the wheel hub, the portions of said members forming the insert hub being disposed apart near their inner edges and brought together at their outer edges to form a cavity, the side walls of the cavity having yielding action, the extreme inner edges of the sections being bent inwardly and abutted against each other and the outer edges thereof bent outwardly at right angles to form a flange.

4. In a wheel construction, an insert hub comprising a pair of disk like members having their inner edges bent inwardly and abutted against each other, said disk members being brought together adjacent their outer edges, the extreme outer edges of the disk members being extended at right angles to form a flange, strips of metal surrounding and secured to the flange, the ends of each strip being extended outwardly from the flange and formed into a semi-socket member, the semi-socket member of one strip coöperating with the semi-socket member of the abutting strip to form a circular socket beyond the periphery of said flange and ears on said semi-socket members.

5. In a wheel construction, the combination with a hub and felly, of flat spring spokes arranged in pairs, each spoke having a lateral extension at its ends adapted to engage the hub and felly respectively, said extensions initially resting at an angle to the faces of the hub and felly, securing means attached to the hub and felly having seats to receive said lateral extensions, said securing means initially resting at an angle to the faces of the spokes, means to draw the securing means into alinement with the faces of the spokes whereby said lateral extensions will be forced into alinement with the faces of the hub and felly and the spokes drawn lengthwise to tension the same, said pairs of spokes being arranged in substantially wish bone formation, whereby any strain or shock to which the hub or felly may be subjected will be equally distributed throughout all of said spokes without changing the said wish bone formation.

6. In a wheel construction, the combination with a hub and felly having yielding spoke receiving members thereon, of flat spring spokes ending in feet and having bowed portions near the inner ends thereof, said feet normally resting at an angle to the hub and felly, said spokes initially being curved gradually and uniformly from a point midway between the foot at the outer end to the bowed portion near the inner end thereof to form a perfect compound curve, whereby when said spokes are placed together at their inner ends and said feet locked into alinement with the faces of the hub and felly by means of said spoke receiving members, said spokes will be uniformly tensioned in pairs of wish bone formation and the inner curves of the spokes shortened and braced against each other whereby any rotary strain at the inner ends of the spokes will be equally transmitted to the outer curvatures of the spokes.

7. In a wheel construction the combination with an insert hub having substantially circular sockets around the periphery thereof and slots between the sockets and hub, of flat spoke members having semi-circular inner ends adapted to form a circle when said ends are placed in coöperation with each other and within the socket and feet extending from the semi-circular ends adapted to enter said seats and be clamped against the hub.

8. In a wheel construction the combination with a felly, of spring spokes having lateral tongue portions at the ends thereof adjacent to the felly, said tongues normally resting at an angle to the felly, clips attached to the felly having seats therein to receive the tongues, ears beyond said seats, said ears being at an angle to the face of the felly, angle plates secured to the felly between said clips, ears on the angle plates coöperating with the ears of the clips and means to lock said ears and the interposed portions of the spoke together and force the tongues into alinement with the face of the felly.

9. In a wheel construction, a felly comprising a pair of circular sections, the edges of which are bent to form inner and outer flanges, the inner flanges extending at right angles to the vertical portion of the felly and the outer flanges being slightly flared outwardly, whereby when a rim is shrunk around the felly the outer flanges will be brought to a right angle and the felly engaged with the rim under compression.

10. In a wheel construction a felly comprising a pair of ring like members of sheet metal, means to secure said members together, the outer and inner edges of said members being bent outwardly to form an outer and inner flange, and a coöperating concavo, convex rib formed in the vertically extending portion of said members.

11. In a wheel construction, a felly comprising a pair of substantially channel shaped members forming when secured together a vertical portion and flanges at each edge thereof and vertical oppositely bowed portions on the vertical portions of the felly coöperating with each other to form a valve stem socket.

12. In a wheel construction, the combination with an insert hub having a flange at its outer edge, strips of metal secured to said flange, ears integral with said strips and extending at an angle away from each other, said ears having seats formed adjacent their connections with the strips, of spring spokes having feet adapted to enter said seats, said feet and seats being so formed that when the ears are clamped into engagement with the spokes the feet will be forced into engagement with the flange.

13. In a wheel construction, the combination with an insert hub and sockets formed thereon, of spoke members arranged in pairs, the inner ends of each pair having bowed portions and feet extending beyond the bowed portions, and means to lock said bowed portions and feet in the sockets.

14. In a wheel construction, the combination with an insert hub having ears projecting in pairs therefrom, said ears having semi-circular portions in their length and seats at their inner ends, of spokes having bowed portions adapted to fit said semi-circular portions of the ears and feet to fit in said seats, and means to lock the ears in engagement with the spokes and clamp the ends thereof in engagement with the ears and insert hub under tension.

15. In a wheel construction, the combination with an insert hub having ears projecting therefrom in pairs, said ears having seats at their inner ends and curved portions in their lengths, of spokes having bowed portions therein to engage the curved portions of the ears and feet to engage said seats, said ears being extended at an angle away from each other whereby when drawn together and clamped against the spokes said bowed portions and feet will be locked under tension in engagement with the curved portions and seats respectively of the ears.

16. In a wheel construction, spokes arranged in pairs, each spoke having a substantially compound curvature, outwardly bowed portions adjacent their inner ends and feet at each end directed at an angle to the parts with which they engage and extending in a straight line from the spokes to their free ends, whereby when clamped in engagement with said parts they will contact the same under tension.

In testimony whereof I have signed my name to this specification in the presence of two subscribing witnesses.

JOHN WORTH CARNAHAN.

Witnesses:
CAREY S. FRYE,
S. W. COCKRELL.